(No Model.)
A. NIEUWENHUYS.
DIOPTRIC LENS FOR RAILWAY CARRIAGE LIGHTS.
No. 478,015. Patented June 28, 1892.
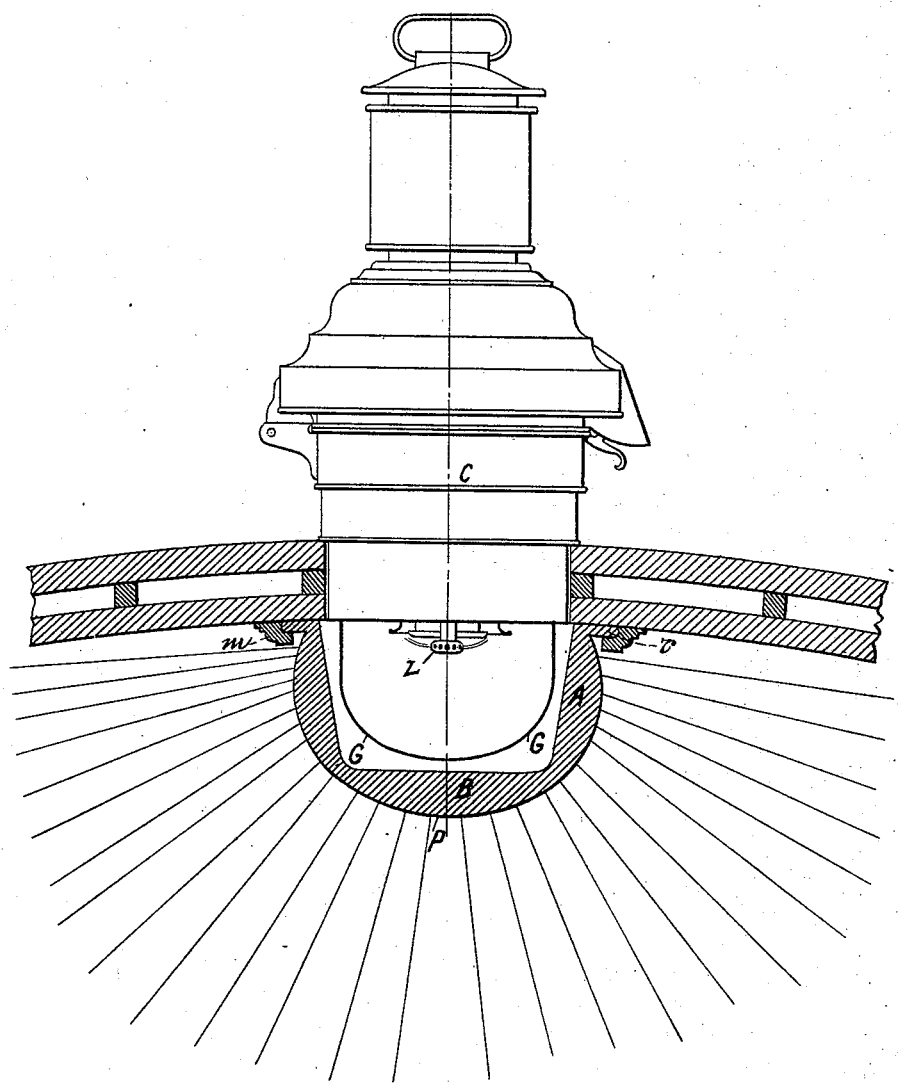
Witnesses:
C. B. Bolton
W. A. Walsh
Inventor:
Auguste Nieuwenhuys
By
his Attorneys.

UNITED STATES PATENT OFFICE.

AUGUSTE NIEUWENHUYS, OF BRUSSELS, BELGIUM.

DIOPTRIC LENS FOR RAILWAY-CARRIAGE LIGHTS.

SPECIFICATION forming part of Letters Patent No. 478,015, dated June 28, 1892.

Application filed January 27, 1892. Serial No. 419,423. (No model.) Patented in Belgium January 11, 1892, No. 73,883.

*To all whom it may concern:*

Be it known that I, AUGUSTE NIEUWENHUYS, of Brussels, in the Kingdom of Belgium, have invented new and useful Improvements in Dioptric Lenses for Railway-Carriage Lights, (for which no patent has been obtained in any country, except in Belgium, on January 11, 1892, No. of Certificate 73,883,) of which the following is a specification.

The object of the present invention is to increase the brightness and steady the vacillating light generally found in railway carriages or coupés by concentrating the luminous rays emitted by the lighting appliances, of whatever kind they may be, by means of a glass or crystal projector of special lenticular construction which is applied around the usual glass globe of the lamp. By this means is obtained a much more intense and steady light, less fatiguing to the eye and enabling one to read easily when at present no reading is possible.

In order to explain the action of the new projector or globe of concentration it is shown in vertical section in the annexed drawing, which shows it applied to the ceiling of a carriage with a lamp or other illuminant of any kind—oil, gas, or electricity.

L is the lamp inserted in the ordinary chimney C. G is the ordinary glass globe which incloses it, and P is the projector or globe of concentration, which is suspended by a flange $r$ in a circular groove $m$.

In order to effect concentration of the light, the walls of the projector must be of lenticular form, such that the light is projected and concentrated in all directions. It is therefore necessary to combine several lenticular bodies, the surface of the whole of these being approximately that of a sphere concentric with the flame or illuminant. In the present example the problem is solved by combining a lenticular convex ring A, somewhat conical in section, with a horizontal convex lens B, forming the bottom, the whole being a kind of globe which can easily be made in one piece and the external spherical surface of which accurately reflects all the luminous rays in all directions, thus shedding great light throughout the compartment.

It might be objected that by the use of the projector P the ordinary globe becomes superfluous and that the projector alone would suffice; but there would be a serious inconvenience in doing away with the glass globe, because the heat of the lamp L would be received directly on the projector P, which might cause it to crack, particularly along the line of junction of the lenticular ring A with the lens B, the thickness of glass along this circle being out of proportion to the rest. This risk is completely avoided by retaining the globe G, which prevents the heat from reaching the projector, the temperature of which remains the more uniform as its interior is ventilated by its communication with the chimney C. The result is therefore attained in a most satisfactory way simply by applying the globe to a lamp of any nature or construction for perfectly lighting a railway-carriage.

Having thus described my said invention and in what manner the same is to be performed, what I claim is—

1. The combination, with any suitable lighting apparatus, of an annular lens combined with a plano-convex lens, the surface being that of a sphere, substantially as set forth.

2. The combination, with any suitable lighting apparatus, of an annular lens combined with a plano-convex lens, the walls of lenticular form causing the light to be projected in all directions, the surface of the whole being that of a sphere, substantially as set forth.

AUGUSTE NIEUWENHUYS.

Witnesses:
 AUG. ZOERIUCU,
 JOSEPH GOFFIN.